United States Patent
Osada et al.

(10) Patent No.: US 7,806,088 B2
(45) Date of Patent: Oct. 5, 2010

(54) PRIMATE RESTRAINT DEVICE

(75) Inventors: Yoshihisa Osada, Tokyo (JP); Yasuo Nagasaka, Iowa City, IA (US)

(73) Assignee: Rikkyo Gakuin, Tokyo (JP)

( * ) Notice: Subject to any disclaimer, the term of this patent is extended or adjusted under 35 U.S.C. 154(b) by 149 days.

(21) Appl. No.: 11/989,642

(22) PCT Filed: Apr. 5, 2006

(86) PCT No.: PCT/JP2006/307218

§ 371 (c)(1),
(2), (4) Date: Jan. 29, 2008

(87) PCT Pub. No.: WO2007/034588

PCT Pub. Date: Mar. 29, 2007

(65) Prior Publication Data

US 2009/0090303 A1   Apr. 9, 2009

(30) Foreign Application Priority Data

Sep. 21, 2005   (JP) .............................. 2005-273223

(51) Int. Cl.
*A01K 1/00* (2006.01)
(52) U.S. Cl. ...................................... 119/752; 119/712
(58) Field of Classification Search ................. 119/161, 119/417–419, 421, 452–455, 462, 712, 728, 119/729, 752
See application file for complete search history.

(56) References Cited

U.S. PATENT DOCUMENTS 2,982,248 A * 5/1961 Hosko, Jr. ................... 119/729

(Continued)

FOREIGN PATENT DOCUMENTS

JP   46-25087   8/1971

(Continued)

OTHER PUBLICATIONS

Microfilm of the specification and drawings annexed to the request of the Japanese Utility Model Application No. 198963.1985 (Laid-open No. 107817/1987) (Mizuo Miyazaki), Jul. 9, 1987.

(Continued)

*Primary Examiner*—Rob Swiatek
*Assistant Examiner*—Ebony Evans
(74) *Attorney, Agent, or Firm*—Venable LLP; James R. Burden; Kyle D. Petaja (57) ABSTRACT

A restraint device for primates capable of providing accurate visual psychological results of experiment by reducing stress given to the primates as subjects and stabilizing the psychological state of the primates. A box-like body (12) formed of a transparent material comprises foot stands (70), a waist stand (72), a first restraint (40) for restraining a body, and a second restraint (42) for restraining a neck in this order starting at the lower part. In both restraints, the first cutout parts (40aa, 42aa) of first plate-like bodies (40a, 42a) and the second cutout parts (40bb, 42bb) of second plate-like bodies (40b, 42b) are mutually overlapped with each other in the directions reverse to each other to form a first hole (50) for restraining the body and a second hole (52) for restraining the neck while adjusting their sizes. The heights and the inclinations of the first and second restraints can be adjusted.

20 Claims, 11 Drawing Sheets

U.S. PATENT DOCUMENTS

| | | | | |
|---|---|---|---|---|
| 3,023,734 | A * | 3/1962 | Schaub | 119/729 |
| 3,153,399 | A * | 10/1964 | Koon | 119/729 |
| 3,195,513 | A * | 7/1965 | Billhorn | 119/729 |
| 3,399,654 | A * | 9/1968 | Schroer | 119/752 |
| 3,429,297 | A * | 2/1969 | Schroer | 119/417 |
| 3,830,201 | A * | 8/1974 | Coulbourn | 119/417 |
| 3,918,406 | A * | 11/1975 | Patterson | 119/473 |
| 4,120,266 | A * | 10/1978 | Oloff et al. | 119/755 |
| 4,213,424 | A * | 7/1980 | Hosch et al. | 119/728 |
| 4,413,588 | A * | 11/1983 | Lindholm | 119/760 |
| 4,995,335 | A * | 2/1991 | Wright | 119/738 |
| 5,134,969 | A * | 8/1992 | Mason et al. | 119/472 |
| 5,186,125 | A * | 2/1993 | Halyung | 119/712 |
| 5,233,939 | A * | 8/1993 | Randolph | 119/473 |
| 5,431,129 | A * | 7/1995 | Clark | 119/468 |
| 5,571,241 | A | 11/1996 | Nagata | |
| 5,943,983 | A * | 8/1999 | Drew et al. | 119/722 |
| 6,047,663 | A * | 4/2000 | Moreau | 119/529 |
| 6,357,394 | B1 * | 3/2002 | Waters et al. | 119/472 |
| 6,412,441 | B1 * | 7/2002 | Aja et al. | 119/417 |
| 6,443,164 | B1 * | 9/2002 | Parker et al. | 132/333 |
| 6,463,887 | B1 * | 10/2002 | Thomas | 119/850 |
| 6,810,834 | B2 * | 11/2004 | Hutchings et al. | 119/529 |
| 7,213,538 | B2 * | 5/2007 | Han et al. | 119/752 |
| 2005/0115512 | A1 * | 6/2005 | Fritsch | 119/454 |

FOREIGN PATENT DOCUMENTS

| | | |
|---|---|---|
| JP | 8-24506 | 6/1995 |
| JP | 11-009129 | 1/1999 |
| JP | 2000-014272 | 1/2000 |

OTHER PUBLICATIONS

Ryuzaburo Nakata, Yasuo Nagasaka, Yoshihisa Osada, "Dobutsu o Mochiita Shinrigaku Jikken ni Okeru Sekigaisen-shiki Touch panel no Dounyu", Rikkyo psychological research, No. 46, Mar. 31, 2004, pp. 33-41.

Yasuo Nagasaka and Yoshihisa Osada "Subjective Contours, amodal Completion, and transparency in animals", The Japanese Journal of Animal Psychology, 50(1), 61-73, (2000).

Yasuo Nagasaka "Comparison of Perception of Illusory Contour and Neon Color Spreading in Squirrel Monkeys" Rikkyo Psychological Research, 43, pp. 19-23 (2001).

* cited by examiner

PRIMATE RESTRAINT DEVICE

TECHNICAL FIELD

The present invention relates to a restraint device which is suitable when used in the implementation of a visual psychology experiment on primates and, in particular, on small primates such as squirrel monkeys.

BACKGROUND ART

Research to find out about the characteristics and behavior of people has been conducted based on the characteristics and behavior of animals excluding humans. In particular, it has been established that the visual phenomena which are referred to as subjective contours, a modal completion, and transparency in human visual psychology are processed in the brain in animals other than humans (called simply 'animals' hereinbelow).

Therefore, research into visual phenomena is performed by making the experiment subject an animal and, in particular, a small primate such as a squirrel monkey (Non-Patent Document 1 ('Animal psychology research', Japanese Animal Psychology Society, 50th Edition, Volume 1, pages 61 to 73, (2000) and Non-Patent Document 2 (St. Paul's University Psychology Research', published by St. Paul's University Department of Psychology Studies, 2001, Vol. 43, pages 19 to 23)).

In cases where psychological experiments are performed on such an animal, the animal serving as the experiment subject must be in a relaxed state without being agitated so as to be able to respond to the experiment problem in order to obtain more reliable experiment data.

Conventionally, examples of systems for performing these kinds of psychological experiments of visual phenomena using animals include systems, that is, response acquisition devices that use an infrared touch panel (Non-Patent Document 3 ('St. Paul's University Psychological Research', published by St. Paul's University Department of Psychological Studies, 46th Edition (2004), excerpts, pages 33 to 41)).

With such conventional systems, an experiment subject such as a squirrel monkey, for example, which is contained in a cage known as an 'operand box', undergoes an experiment completely unrestrained in the cage. Alternatively, the experiment subject undergoes the experiment in a state where the upper half of the squirrel monkey is unrestrained, and in a state where the lower half thereof is restrained from moving freely.

However, a 'primate retention device', that is, a 'restraint device', which is employed in order to perform an experiment for the administration of drugs given to humans or other desired experiments on an animal such as a squirrel monkey, has been proposed. This restraint device restrains the monkey by pushing the monkey so that same is unable to move freely in the space between a lattice-like movable barrier wall and a lattice-like rear wall which is capable of opening and closing. In order to more reliably restrain the behavior of the squirrel monkey, the restraint device has a structure that involves attaching a ring to the monkey's collar, inserting a rod in the ring, and fixing the other end of the rod to the lattice of either wall (Patent Document 1).

Patent Document 1: Japanese Publication No. H8-24506

Non-Patent Document 1: 'Animal psychology research', Japanese Animal Psychology Society, 50th Edition, Volume 1, pages 61 to 73, (2000)

Non-Patent Document 2: St. Paul's University Psychology Research', published by St. Paul's University Department of Psychology Studies, 2001, Vol. 43, pages 19 to 23

Non-Patent Document 3: 'St. Paul's University Psychological Research', published by St. Paul's University Department of Psychological Studies, 46th Edition (2004), excerpts, pages 33 to 41.

DISCLOSURE OF THE INVENTION

Problems to be Solved by the Invention

Non-Patent Document 3 discloses a procedure for visual psychological experiments on an animal experiment subject which utilizes a reaction acquisition device of a touch panel system. With this procedure, a sample image (known as a 'sample') is normally displayed onto the screen, whereupon selection images such as an image which is the same as or similar to the sample image and a completely different image (also called a 'target' or 'distracter') are displayed onto the screen. The animal which is the experiment subject visually identifies the sample image that was first displayed, looks at the selection images that are then displayed, and responds by touching the image which is the same or similar on the screen. In this experiment, by statistically investigating whether the same or a similar image is selected in a preset short time (two seconds, for example), an evaluation of the reactions to visual stimuli of the experiment subject is carried out.

During this experiment, it is desirable that the experiment conditions, that is, the posture with which the experiment subject observes the screen be as fixed as possible. This is because, when the distance between the position of the animal's eyes and the screen on which visual stimuli are displayed (the 'viewing distance' hereinbelow) and the position of the eyes viewing the screen (the 'viewing position' hereinbelow) change, the viewing conditions for looking at the image displayed onto the screen change and, therefore, the experiment conditions change and there is the risk that a correct experiment result is not obtained.

A conventional commercialized cage may also be used as the cage for performing this experiment. However, a commercial cage does not have a structure based on the premise of being used for such psychological experiments on animals. Hence, the present state of affairs is such that, in cases where such a cage is employed, the researcher suitably refines the cage to fix the lower half of the animal's body but performs the experiment without fixing the upper half of the animal's body. Therefore, the viewing distance and viewing position with which the monkey views the selection images cannot be fixed. For this reason, even when the experiment is carried out with the animal restrained in the cage, the animal freely moves the upper half of its body in particular and, therefore, changes in the animal's posture are not mirrored in the experiment results and it is difficult to keep the viewing distance and viewing position between the animal which is the experiment subject and the screen. Hence, there is the problem that experiment results in a state where the experiment subject is in a normal posture cannot be expected.

The restraint device disclosed in Patent Document 1 has a structure that restrains the behavior of the monkey by inserting a rod into the ring attached to the monkey's neck. However, with such a structure, the head of the monkey is able to move up and down and left and right around the rod and, therefore, the screen can be seen in a posture position in which the head has moved. Hence, it is hard to keep the viewing distance between the monkey and the screen as well as the viewing position fixed.

Moreover, the restraint device pushes the monkey to restrain same in the space between the movable barrier wall and rear wall so that the monkey is unable to move freely. Therefore, the monkey is restrained with an external force that is greater than necessary. Hence, there is the problem that the monkey receives psychological pressure to a degree that is reflected in the experiment results, that is, extreme stress that creates a state where the monkey is unable to react to the visual stimuli.

Means for Solving the Problems

An object of the present invention is to provide a primate restraint device which, as far as possible, is able to fixedly hold the viewing position and the viewing distance between the primate who is to be the experiment subject and the screen, and reduce the stress on the primate as much as possible.

According to an aspect of the present invention, there is provided a restraint device that is used disposed opposite a touch panel in order to carry out primate visual psychological experiments and is constituted having following constitutional features.

The restraint device comprises a box-shaped body that houses a primate. This box-shaped body comprises first and second side walls that are provided opposite one another and has a front wall and a rear wall which are provided opposite one another between the side walls. In addition, the box-shaped body comprises, therein, a foot stand, a waist stand, first restraining means and second restraining means, which are provided in this order starting from the bottom. The first restraining means has a constitution in which a first hole for restraining the body of the primate can be made adjustable in size. The second restraining means have a constitution in which a second hole for restraining the neck of the primate can be made adjustable in size.

The first and second holes are adjusted in a positional relationship in which the restrained body and neck of the primate, which are restrained in their respective holes, stand on a vertical straight line.

In addition, the first resolving means and second resolving means are each provided between the first and second side walls opposite the box-shaped body. In this case, the first and second restraining means each comprise respective first adjustment means and second adjustment means which adjust the height and tilt of the first and second restraining means.

According to the above constitution of the restraint device, the primate is housed in the box-shaped body which is enclosed by four walls and sits on the waist stand with its feet placed on the foot stool. The body of the primate is closely restrained by the first hole of the first restraining means by adjusting the size of the first hole and the neck is closely restrained by the second hole of the second restraining means by adjusting the size of the first hole. The loose restraint involves a restraining force of a magnitude that allows the body and neck to turn but limits upward and downward movements. As a result of this restraint, the body and neck are each fixed in set positions of the first and second restraining means and the body and neck can be fixed in positions a fixed distance apart on a substantially vertical straight line. As a result, there is no lateral displacement or vertical displacement of the primate's head. Hence, when a visual psychological experiment is carried out, the viewing distance (also called the 'visual distance') between the primate's eyes and the touch panel, that is, the screen and the viewing position (also known as the 'visual position') can be kept fixed. Accordingly, experiment results which are more accurate than conventional results can be obtained.

In addition, with the restraint device, the restraining force on the neck and body is weak and, therefore, the primate is able to turn its neck and body and, therefore, the primate does not undergo a feeling of oppression caused by such restraint. Accordingly, the stress felt by the primate is far smaller than that caused by conventional devices. Hence, it may be said that the psychological state of the primate during restraint is more stable than with the prior art and, therefore, also for this reason, experiment results which are more accurate than conventional experiment results can be obtained.

With the restraint device, the heights of the first and second restraining means can be adjusted by the first and second adjustment means and, therefore, the respective positions can be set in accordance with the size of the primate. Hence, the primate can be restrained in accordance with the distance from the primate's waist to neck and, therefore, the stress to which the primate is subjected is far smaller than with the abovementioned conventional devices.

In addition, because the second restraining means can be tilted and fixed, the primate is able to easily view the display screen of the touch panel without the field of view being blocked by the second restraining means.

Hence, more accurate experiment results can be obtained in a psychological experiment.

Furthermore, according to a preferred embodiment of the present invention, the first restraining means and second restraining means are each constituted by first and second plate-like bodies having a square planar shape. In this case, the first plate-like body is provided with a first cutout part which is U-shaped from one edge to an opposing edge and the second plate-like body is provided with a second cutout part which is U-shaped from one edge to an opposing edge. In addition, the first and second plate-like bodies of the first restraining means form the first hole by overlapping the first and second cutout parts in mutually opposite directions. However, the first and second plate-like bodies of the second restraining means form the second hole by overlapping the first and second cutout parts in mutually opposite directions.

According to such a preferred embodiment of the restraint device, after the body and neck are each guided into the first cutout parts of the respective first plate-like bodies of the first and second restraint devices, the first and second holes can be formed so that the body and neck are each restrained loosely while the second plate-like bodies are moved in the second cutout parts of the respective second plate-like bodies. Hence, the restraint of the primate can be performed easily without subjecting the primate to stress that is more excessive than that exerted by a conventional device.

In addition, the first and second plate-like bodies may preferably be formed by a transparent material in carrying out the present invention.

According to such a preferred embodiment of the restraint device, the respective first and second plate-like bodies of the first and second restraint devices are formed by a transparent material and, therefore, the primate is permitted an unobstructed view outside the box-shaped body without the field of view being blocked by the plate-like bodies. Hence, there is no excessive stress on the primate in the middle of an experiment.

According to yet another preferred embodiment of the present invention, the first side wall, second side wall, front wall and rear wall of the box-shaped body may be constituted by a transparent material. The front wall is provided in the box-shaped body above the first restraining means as a member which forms an opening. This opening is formed to allow the primate to put its hand outside the box-shaped body. This opening may also be formed with a wider area than the screen area to an extent that allows the area of the display screen of the touch panel which is disposed opposite the restraint device in the area of the opening. Furthermore, the rear wall is provided in the box-shaped body as a door that opens and closes freely to allow the primate to enter and exit the box-shaped body.

According to such a preferred embodiment of the restraint device, the first side wall, second side wall, front wall and rear wall of the box-shaped body are constituted by a transparent material and the primate is permitted an unobstructed view outside the box-shaped body without the field of view being blocked by these walls. Hence, the primate is able to make a visual check outside the box-shaped body and the primate is therefore not subjected to excessive stress. In addition, the front wall has an opening formed in the part facing the display screen of the touch panel and, therefore, there is no obstacle which would be a hindrance to the primate's act of touching the display screen using its fingers when responding in a psychological experiment. Therefore, because the primate is able to easily perform the act of touching the display screen with its fingers without being subjected to excess stress, more accurate experiment results can be obtained. In addition, because all of the walls are transparent, the manager is able to easily observe the primate's appearance from the outside directly or by means of a monitoring camera.

In addition, in carrying out the present invention, the foot stand is preferably a drain board or wire mesh which are detachably provided in the box-shaped body and the waist stand is preferably held linked to the foot stand.

According to such a preferred embodiment of the restraint device, because the foot stand is constituted by a drain board or wire mesh, secessions or excretions from the primate can be allowed to drop below the foot stand. In addition, because the waist stand is retained by linking the waist stand to the foot stand, the height of the waist stand can be adjusted by changing the position in which the foot stand is attached to the box-shaped body.

Moreover, in carrying out the present invention, a tray for excretions and so forth is preferably detachably provided in the box-shaped body below the foot stand.

According to such a preferred embodiment of the restraint device, because the tray for secessions and excretions is provided, same are not scattered outside the box-shaped body. Hence, the environment for the psychological experiment can be kept clean and the stress which would otherwise be caused the primate and manager can be reduced.

In addition, according to a preferred embodiment of the present invention, a wheeled platform may be provided on the lower end of the box-shaped body.

According to the restraint device, a restraint device that houses a primate can be easily moved by means of the wheeled platform which the box-shaped body comprises.

BEST MODE FOR CARRYING OUT THE INVENTION

An embodiment of the present invention will be described herein below with reference to the drawings. The drawings merely serve to schematically illustrate the shape, size and positional relationships of the respective constituent elements to an extent which allows the present invention to be understood. Further, the constituent examples of the embodiment which will be described herein below are merely additional suitable examples and it is understood that the present invention is not limited in any way to these suitable examples.

The embodiment of the restraint device of the present invention will be described hereinbelow with reference to FIGS. 1 to 11. In the following description, the box-shaped body is not limited in any way. An example in which the cross-sectional shape is a square will be described.

The restraint device 10 of the present invention comprises a box-shaped body 12 that constitutes a housing chamber that houses a primate. The box-shaped body 12 comprises a front wall 14, a rear wall 16, a first side wall 18 and a second side wall 20. The respective walls form rectangular plate-like bodies.

Figure 1:
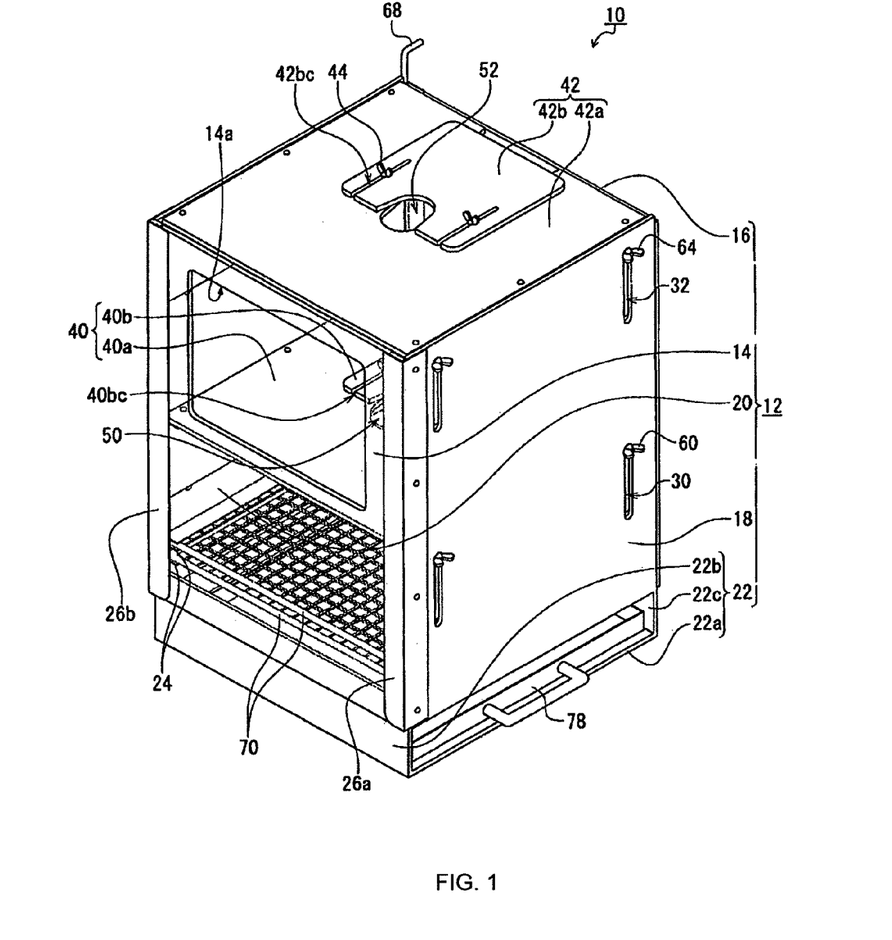
FIG. 1 is a schematic perspective view for explaining a constitution of a restraint device according to the embodiment of the present invention.
Figure 2:
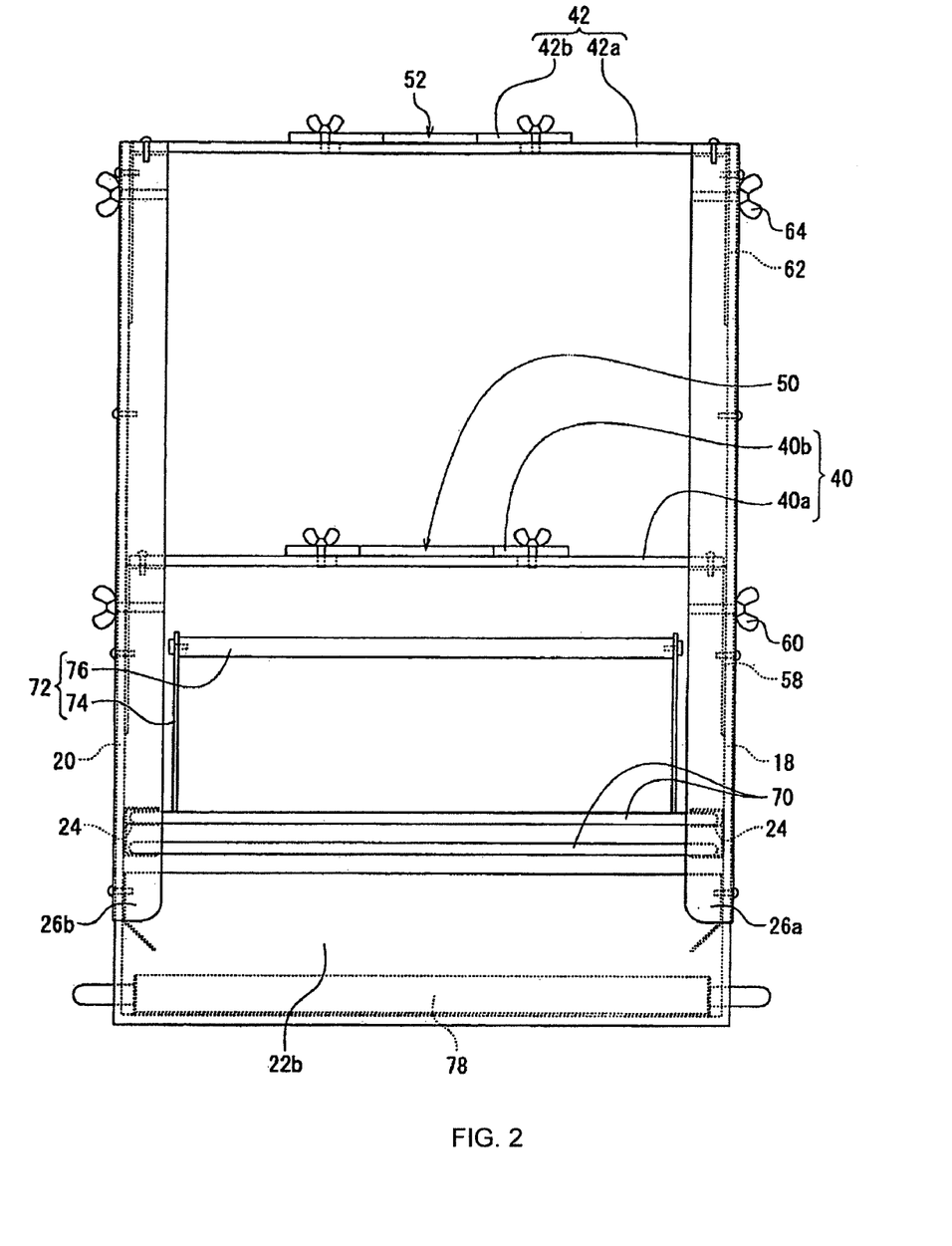
FIG. 2 is a front view of the restraint device shown in FIG. 1.
Figure 3:
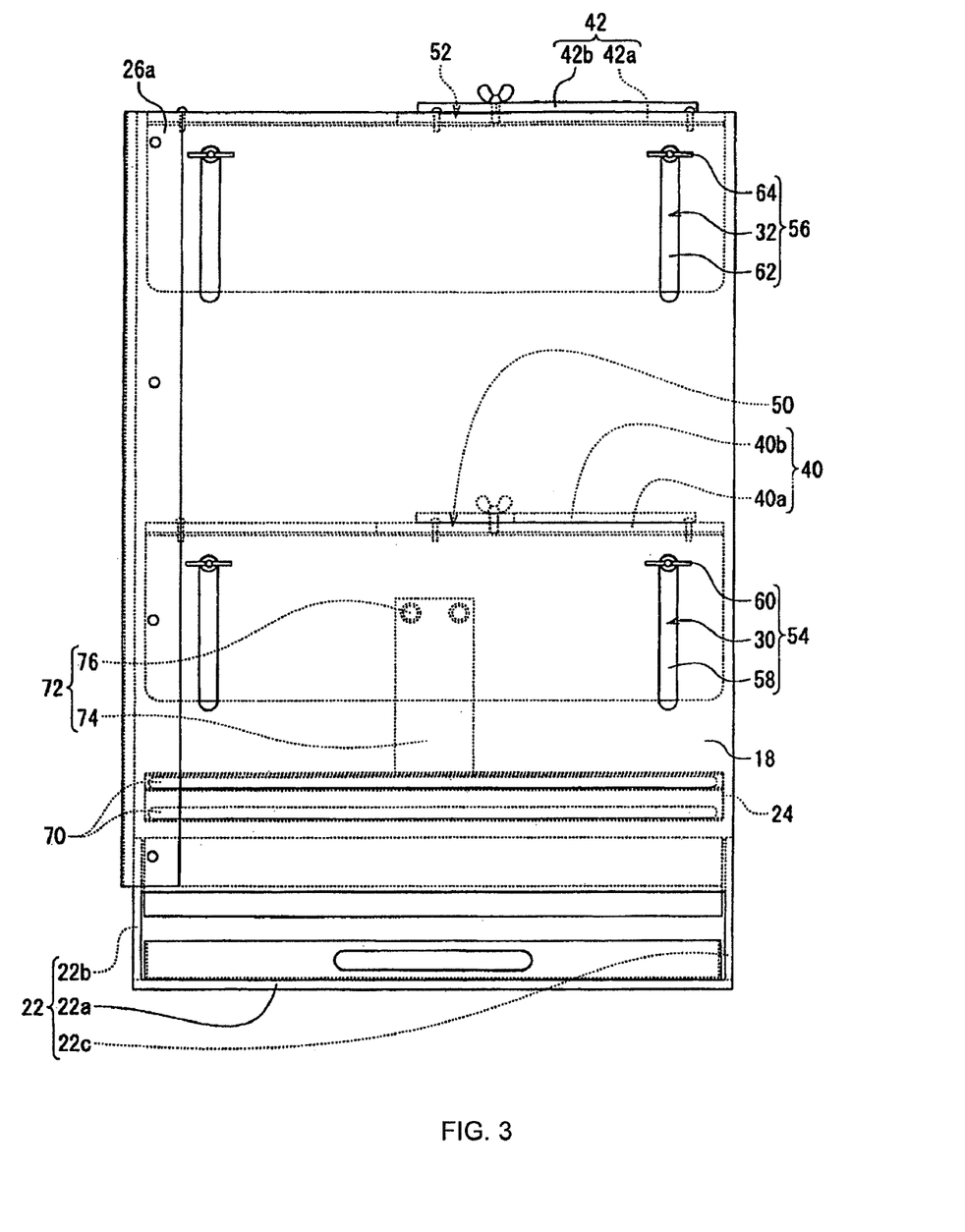
FIG. 3 is a right-side view of the restraint device shown in FIG. 1.
Figure 4:
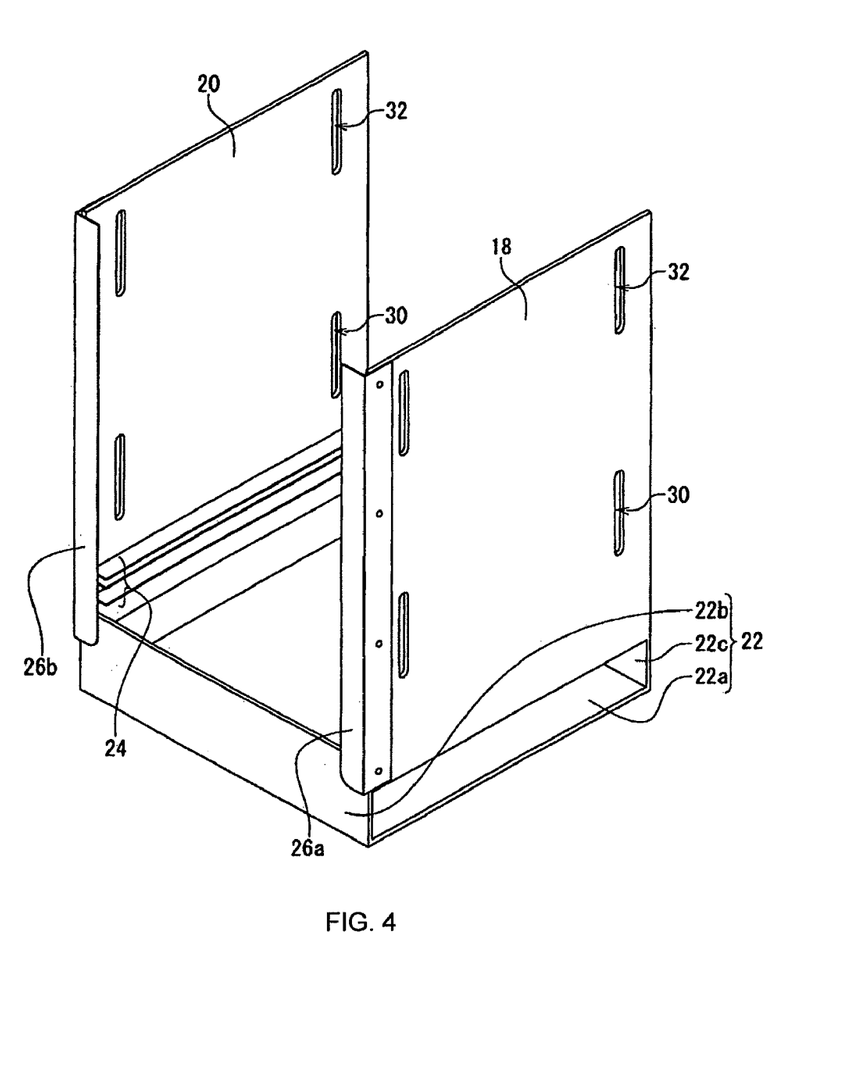
FIG. 4 is a schematic diagram for explaining the constitutional examples of the bottom and the first and second side walls of the restraint device.

In the constitutional examples shown in FIGS. 1 and 4, the bottom 22 of the box-shaped body 12 comprises a bottom plate 22a, and side plates 22b and 22c which are provided so as to rise toward and make contact with the two sides of the bottom plate 22a. These side plates are provided as a front face and a rear face.

First, the bottom 22 and two side walls will be described. The bottom 22 is open at the left and right faces of the box-shaped body without the provision of the side plates.

The left and right sides at the top of the bottom 22 are provided with the first side wall 18 and second side wall 20. These first and second side walls 18 and 20 are provided integrally and in continuous contact with the side walls of the bottom 22. The bottom of the rear sides of the first and second side walls 18 and 20, that is, the interior of the box-shaped body is provided with a rail or guide 24 (described subsequently) that slidably contains a drain board or wire mesh. In addition, long plate members 26a and 26b which have an L-shaped cross-section are attached along one edge of the front side of the box-shaped body of the first and second side walls 18 and 20. These L-shaped plate members 26a and 26b are attached to the edges of the side walls 18 and 20 so as to be raised by the thickness of the front wall 14 from the end faces of the side walls 18 and 20. The front wall 14 is held inserted in a gap corresponding with the thickness.

In addition, the first and second side walls 18 and 20 are provided with elongated holes, that is, upright holes 30, and 32, 32 along both sides in middle positions and upper positions respectively. These upright holes 30, 30 are provided parallel and spaced apart from one another and the upright holes 32, 32 are likewise provided in parallel and spaced apart from one another. The upright holes 30, 32 and the upright holes 30, 32 may be provided disposed on a straight line at the top and bottom respectively. Further, the respective hole widths and lengths may preferably be the same. These upright holes are constituent elements that constitute first and second adjustment means for adjusting the height and tilt of the first and second restraining means. The first and second adjustment means will be described subsequently.

These restraining means will mainly be described hereinbelow with reference to FIGS. 1 to 5. The first restraining means 40 and second restraining means 42 are attached between the first and second side walls. The first restraining means 40 is means for restraining the body of the primate. The second restraining means is means for restraining the neck part of the primate.

Figure 5A:
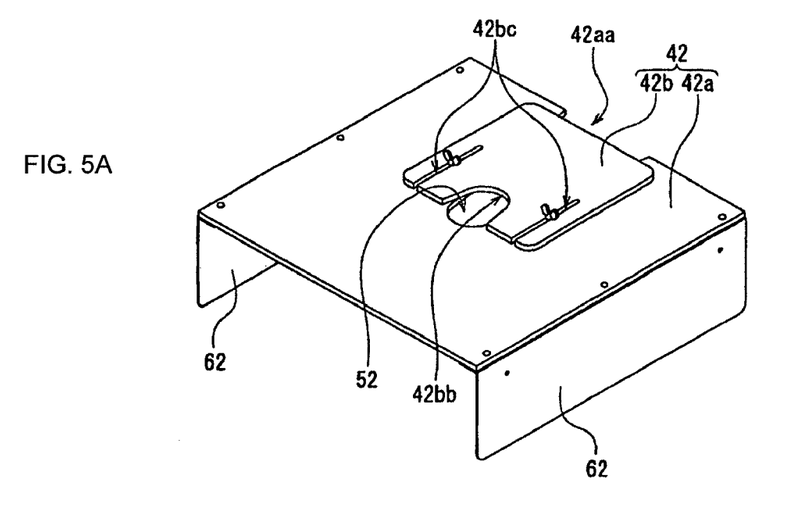
FIGS. 5A and 5B are schematic diagrams for explaining the constituent examples of the first and second restraining means of the restraint device.
Figure 5B:
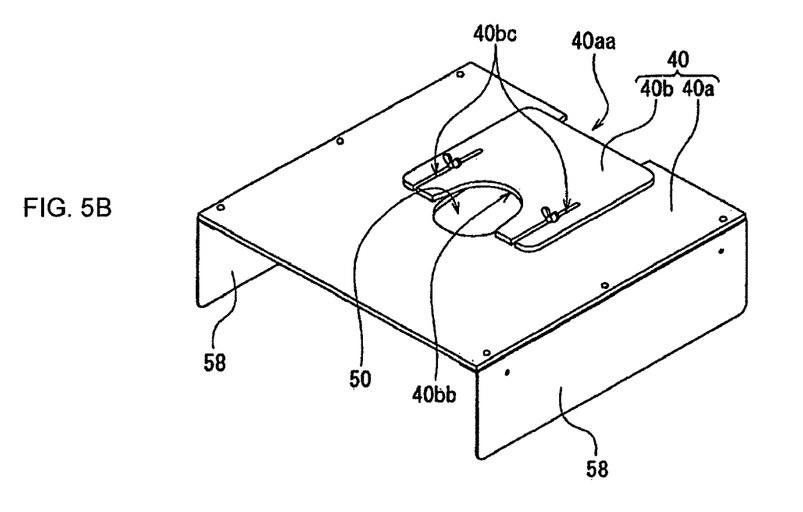

The first restraining means 40 is constituted by the first and second plate-like bodies 40a and 40b with a square planar shape and the second restraining means 42 is constituted by first and second plate-like bodies 42a and 42b with a square planar shape (See FIG. 5 in particular). The first plate-like bodies 40a and 42a are provided with first cutout parts 40aa and 42aa respectively which are U-shaped from one edge to an opposing edge. Meanwhile, the second plate-like bodies 40b and 42b are provided with second cutout parts 40bb and 42bb respectively which are U-shaped from one edge to an opposing edge. The first cutout part 40aa of the first plate-like body 40a is formed slightly longer and slightly larger than the first cutout part 42aa of the first plate-like body 42a.

Likewise, the second cutout part 40bb of the second plate-like body 40b is formed slightly longer and slightly larger than the second cutout part 42bb of the second plate-like body 42b.

The first and second plate-like bodies 40a and 40b respectively of the first restraining means 40 are combined by overlapping the respective first and second cutout parts 40aa and 40bb in mutually opposite directions. By vertically combining the first and second plate-like bodies 40a and 40b, a first hole 50 formed by overlapping the first and second cutout parts 40aa and 40bb is obtained. The first hole 50 is a hole for restraining the body of the primate.

Likewise, the first and second plate-like bodies 42a and 42b of the second restraining means 42 are combined by overlapping the first and second cutout parts 42aa and 42bb in mutually opposite directions. By vertically combining the first and second plate-like bodies 42a and 42b, a second hole 52 formed by overlapping the first and second cutout parts 42aa and 42bb is obtained. The second hole 52 is a hole for restraining the neck of the primate.

The first hole 50 and second hole 52 are formed with the waist part and neck part arranged on a substantially vertical straight line when the primate is restrained by means of the respective first and second holes. The formation of holes 50 and 52 is performed by adjusting the fixed positions of the second plate-like bodies 40b and 42b with respect to the respective first plate-like bodies 40a and 42a. The position adjustment can be carried out by using parallel elongated holes 40bc and 42bc which are provided in the second plate-like bodies 40b and 42b respectively and a suitable fixing tool 44 such as a screw which screws the second plate-like bodies 40b and 42b to the respective first plate-like bodies 40a and 42a through insertion into elongated holes 40bc and 42bc. That is, by carrying out position adjustment with respect to the first plate-like bodies 40a and 42a while sliding the second plate-like bodies 40b and 42b along the elongated holes 40bc and 42bc, the sizes of the respective holes 50 and 52 are adjusted in accordance with the size of the primate which is being restrained, whereupon the two plate-like bodies 40a and 40b and 42a and 42b respectively may be fixed by means of the fixing means 44. As a result of this adjustment, the first and second holes 50 and 52 respectively which permit the primate's body and neck to be restrained in a positional relationship in which the body and neck stand side by side on a vertical straight line can be formed.

The respective first and second restraining means 40 and 42 comprise first and second adjustment means 54 and 56 which allow the height and tilt of the first and second restraining means 40 and 42 to be adjusted.

The first and second adjustment means will be described hereinbelow. The first adjustment means 54 is constituted by the already described upright holes 30, a first auxiliary plate body 58 and a fixing tool 60 such as a screw that is inserted into the upright holes 30 and screwed to the auxiliary plate body. The first auxiliary plate body 58 is formed having a substantially rectangular shape such that the length in the direction between the front and rear walls is shorter than the distance between the front and rear walls. In order to attach the first plate-like body 40a to the first side wall 18 and second side wall 20, first auxiliary plate-like bodies 58 are provided attached orthogonal to the first plate-like body 40a on the two opposite sides of the first plate-like body 40a so that the first auxiliary plate-like bodies 58 are mutually parallel to one another. The hole width of the upright holes 30 is formed so that the first restraining means 40 can be fixed in a tilted position by affording the two fixing tools 60 which penetrate the two parallel upright holes 30 in the side walls of the first adjustment means 54 mutually displaced height levels.

Likewise, the second adjustment means 56 is constituted by the already described upright holes 32, a second auxiliary plate-like body 62, and a fixing tool 64 such as a screw that is inserted into the upright holes 32 and screwed to the auxiliary plate-like body. The second auxiliary plate-like body 62 has a substantially rectangular shape and the length in the direction between the front and rear walls is made shorter than the distance between the front and rear walls. In order to attach the second plate-like body 42a to the first and second side walls 18 and 20, second auxiliary plate-like bodies 62 are provided attached orthogonal to the first plate-like body 42a on the two opposite sides of the first plate-like body 42a so that the second auxiliary plate-like bodies 62 are mutually parallel to one another. The hole width of the upright holes 32 is formed so that the second restraining means 42 can be fixed in a tilted position by affording the two fixing tools 64 which penetrate the two parallel upright holes 32 in the side walls of the second adjustment means 56 mutually displaced height levels.

Figure 13:
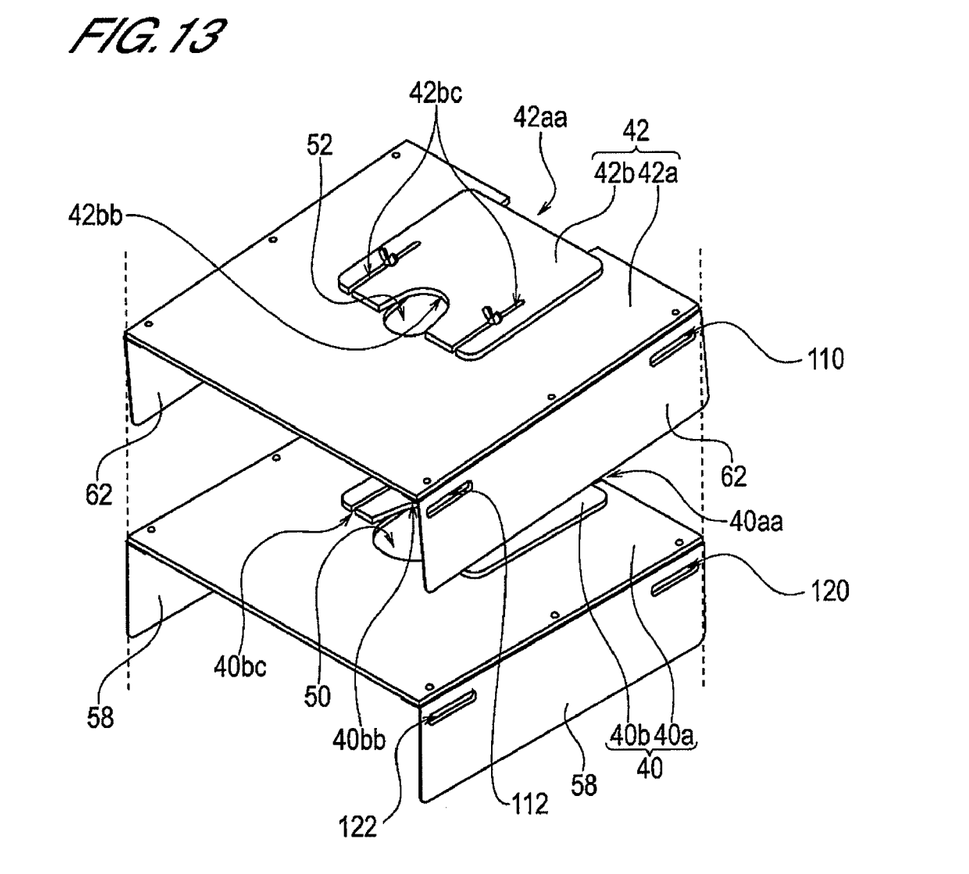
FIG. 13 is a schematic diagram for explaining another constitutional example of first and second restraining means of the restraint device.

In the abovementioned constitutional example, the adjustment of the height and tilt of the first and second adjustment means 54 and 56 is carried out by using the respective first and second auxiliary plate-like bodies 58 and 62 of the first and second restraining means 40 and 42 respectively, first and second side walls 18 and 20, and fixing tools 60 and 64 such as screws. However, this is merely an example and nuts and bolts may also be employed instead of screws as the fixing tools. In addition, the constitution may also be such that the first and second auxiliary plate- like bodies 58 and 62 are provided with elongated holes that extend in a direction orthogonal to the upright holes, that is, lateral holes, and such that a fastening tool which is inserted into the upright holes and lateral holes is used to adjust the height and tilt of the first and second auxiliary plate-like bodies 58 and 62. The elongated lateral holes 110, 112 and 120, 122 are shown in FIG. 13.

In the illustrated example, the first and second auxiliary plate-like bodies 58 and 62 are provided in a downward direction along the first and second side walls 18 and 20.

Figure 6:
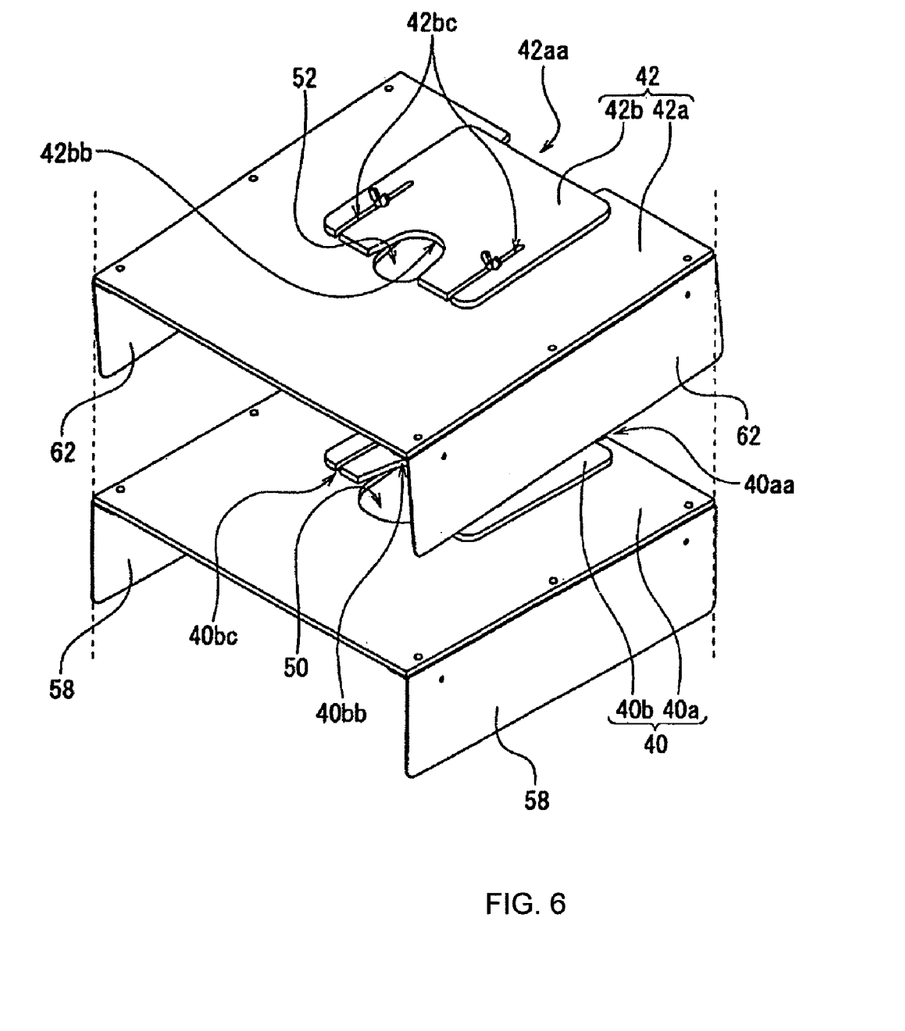
FIG. 6 is an explanatory diagram for explaining the height position and tilt adjustment of the first and second restraining means of the restraint device.

FIG. 6 shows an example of a state where the first restraining means 40 is held in a horizontal direction and the second restraining means 42 is adjusted through tilting. Here, the side of the front wall 14 of the first plate-like body 42*a* of the second restraining means 42 is made to tilt as a result of a lower alignment than on the rear wall 16 side.

FIG. 6 shows only first and second plate-like bodies 40*a* and 42*a* and 40*b* and 42*b* and the first and second auxiliary plate-like bodies 58 and 62 of the two restraining means 40 and 42 respectively. An illustration of the other constituent elements is omitted here.

Figure 7A:
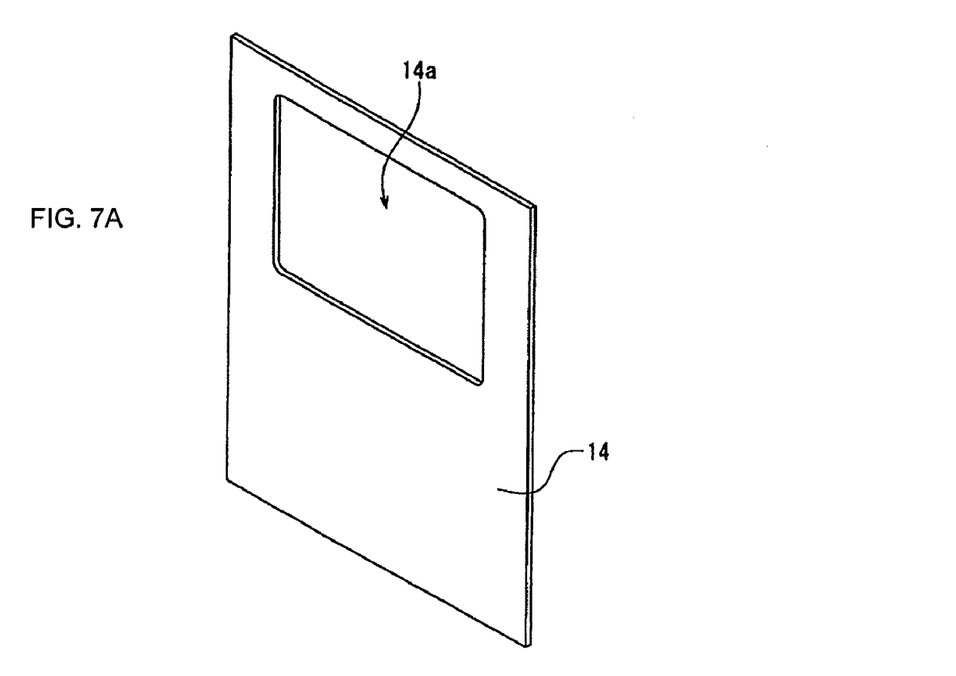
FIGS. 7A and 7B are perspective views of constitutional examples of the front wall which is attached to the restraint device.
Figure 7B:
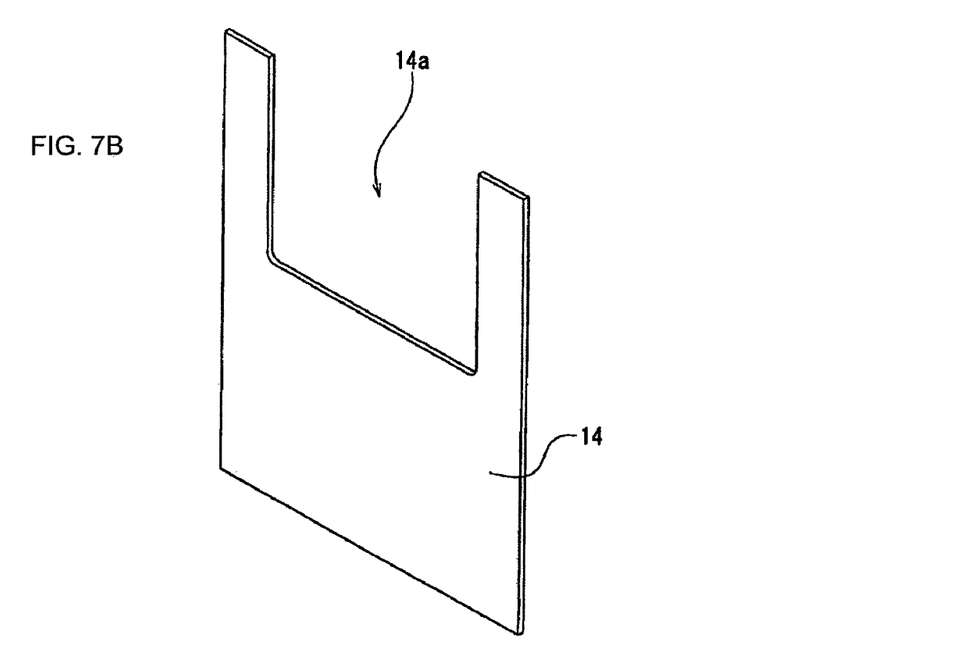
Figure 11:
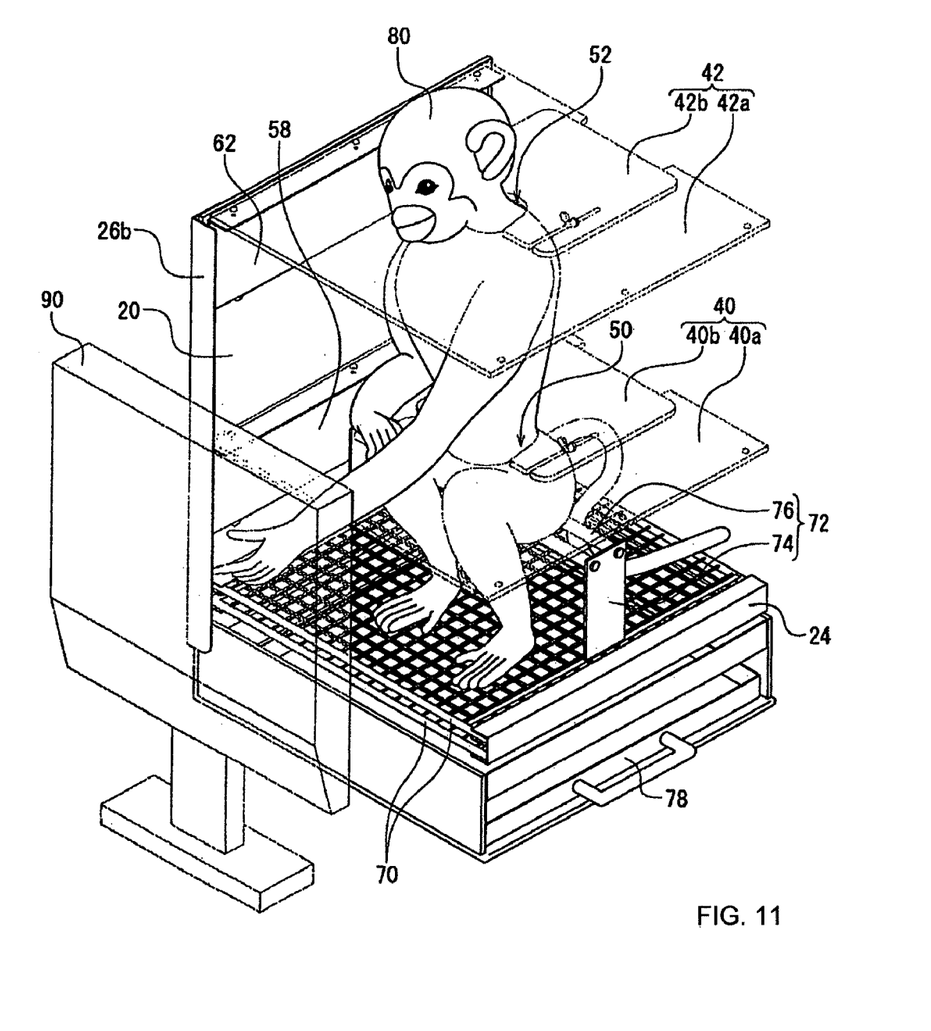
FIG. 11 is a perspective view of an example of an aspect when an experiment is carried out by housing and restraining a squirrel monkey in the restraint device.

The front wall 14 will be described next mainly with reference to FIGS. 1 and 7A and 7B. The front wall 14 is inserted to follow the guidance groove formed by the L-shaped plate members 26*a* and 26*b* provided in a vertical direction on both sides of the front face of the box-shaped body as was described earlier. The front wall 14 has a touch-panel type monitor disposed opposite the front face as shown in FIG. 11. Hence, the front wall 14 is formed with a wide opening in a higher position than the first restraining means 40. This opening constitutes a window 14*a* which is wider than the display screen of a touch panel 90. The constitution is such that the primate is able to do work by putting its hand outside the box-shaped body 12 via the window 14*a* provided in the front wall 14 and touching the touch panel with its fingers.

This window 14*a* may also be a window in an optionally suitable form which corresponds with a square cutout window (FIG. 7A), a U-shaped cutout window (FIG. 7B) or another design. Alternatively, the constitution may also be such that the front wall 14 is provided only in a lower position than the first restraining means 40 while the area above the front wall 14 is open.

Figure 8:
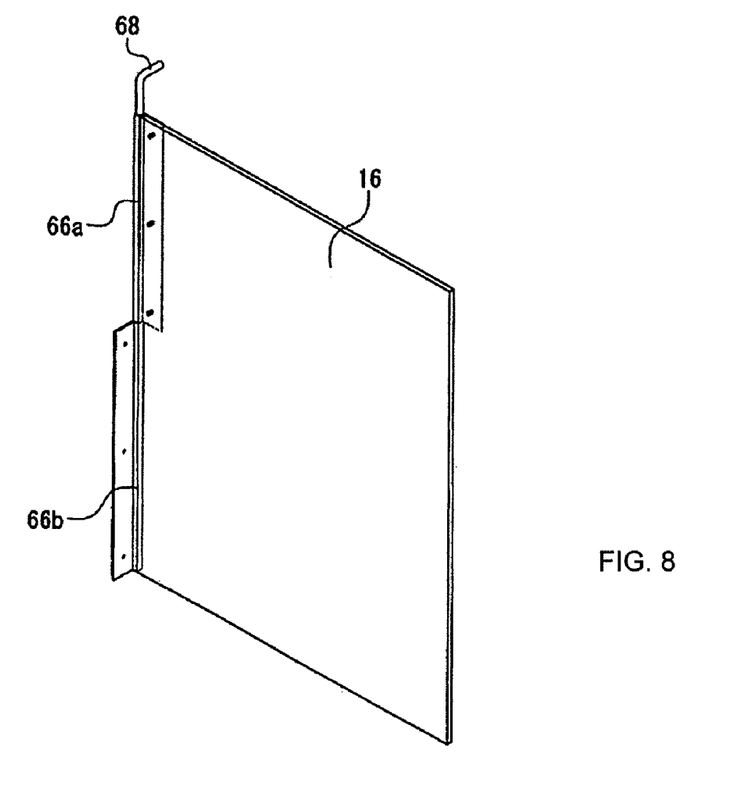
FIG. 8 is a perspective view of a constitutional example of the rear wall which is attached to the restraint device.

The rear wall 16 will be described next mainly with reference to FIGS. 1 and 8. The rear wall 16 is turnably attached to the end face of either of the first and second side walls 18 and 20 respectively. As a result of being turnably attached, the rear wall 16 allows a squirrel monkey which is a primate to enter and exit the box-shaped body 12.

The rear wall 16 constitutes a front door which allows the primate to enter and exit the box-shaped body 12. Hence, the rear wall 16 is constituted so as to be capable of opening when the primate is restrained and when the restraint is released and to close during the experiment. In the constitutional example illustrated, the constitution is such that one edge of the rear wall 16 in the vertical direction thereof and one edge of either of the left and right side walls 18 and 20 in the vertical direction thereof are joined by means of a hinge. In FIG. 8, the hinge provided on the rear side wall is indicated by 66*a* and the hinge provided on the side wall below hinge 66*a* in a vertical direction is indicated by 66*b*. A long straight pin which passes through hinges 66*a* and 66*b* is indicated by 68.

The front wall 14 and rear wall 16 and the first and second side walls 18 and 20 which constitute the box-shaped body 12 are preferably constituted by a transparent material such as plastic. These walls are preferably constituted by acrylic resin because acrylic resin is easy to machine, inexpensive, and robust. Likewise, the respective first and second plate-like bodies 40*a* and 40*b* and 42*a* and 42*b* which constitute the first and second restraining means 40 and 42 respectively may be preferably constituted by a transparent material.

Thus, in cases where the respective constituent elements are constituted by a transparent material, the restrained primate is easily afforded an unobstructed view and the stress which the primate risks being subjected to can be suitably reduced. Moreover, there is the advantage that the appearance of the primate can be easily observed by the researcher during the experiment.

If the L-shaped plate members 26*a* and 26*b*, the first auxiliary plate-like bodies 58 and 62, and the fixing tools 60 and 64 can be constituted by a transparent material, these parts are preferably constituted by a transparent material. This is so that an unobstructed view can be easily provided of the inside from outside the box-shaped body 12 and of the outside from the inside of the box-shaped body 12.

Figure 9:
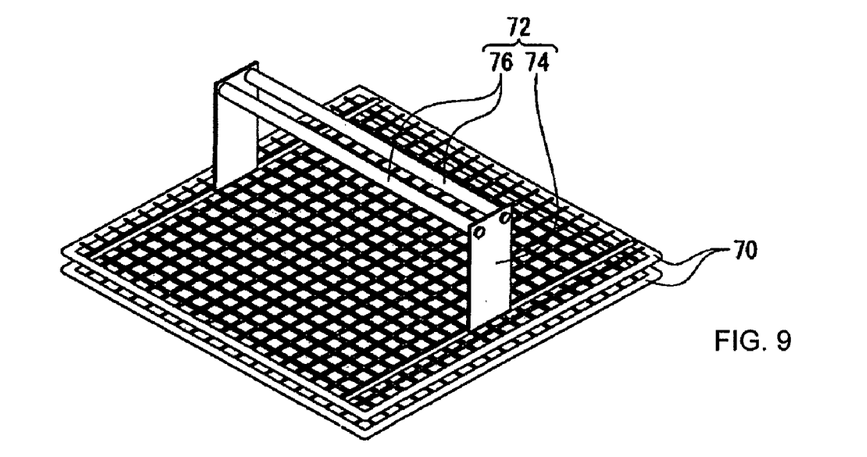
FIG. 9 is a perspective view of a constitutional example of an integrated structure of a foot stand and waist stand which are attached to the restraint device.

The restraint device further comprises a foot stand and a waist stand. The foot stand and the waist stand which is integrated therewith are shown in FIG. 9 in a perspective view.

The foot stand 70 is constituted by a drain board or wire mesh with a square planar shape. Although the foot stand has two levels in this constitutional example, the foot stand is not limited to such a constitution and may have a one-level constitution. As long as the foot stand 70 has a constitution in which excretions from the primate or secessions from the primate are allowed to drop below the foot stand 70, an optional suitable constitution other than a drain board or wire mesh is possible.

The waist stand 72 is fixed to the two opposing edges of the drain board-like foot stand and is constituted by holding plates 74 which protrude in a vertical direction and by two parallel rod-like or tubular bodies 76 which are held in a horizontal direction by the holding plates 74. The rod-like bodies 76 of the waist stand 72 are provided in a positional relationship that allows the body and neck of the primate to be restrained in a substantially vertical straight line in a state where the primate is sitting down.

The integrated structure of the foot stand 70 and waist stand 72 can be freely integrated through insertion into the box-shaped body 12 as a result of being slid along the already described rail or guide 24. In the illustrated example, by sliding the foot stand 70 from the rear wall to the rail 24, the integrated structure can be introduced to and removed from the box-shaped body 12. In this case, by vertically providing a plurality of rails 24 in parallel, the height of the structure of the foot stand and waist stand can be adjusted. In addition, in the above constitutional example, a foot stand and waist stand are shown as an integrated structure but same can also be constituted as individual structures so that the heights of same can be individually adjusted. These constitutions are merely design problems.

The foot stand and waist stand mentioned above may be preferably formed using metal but are not limited thereto. The foot stand and waist stand may also be formed from an optionally preferable material in accordance with the design.

Figure 10:
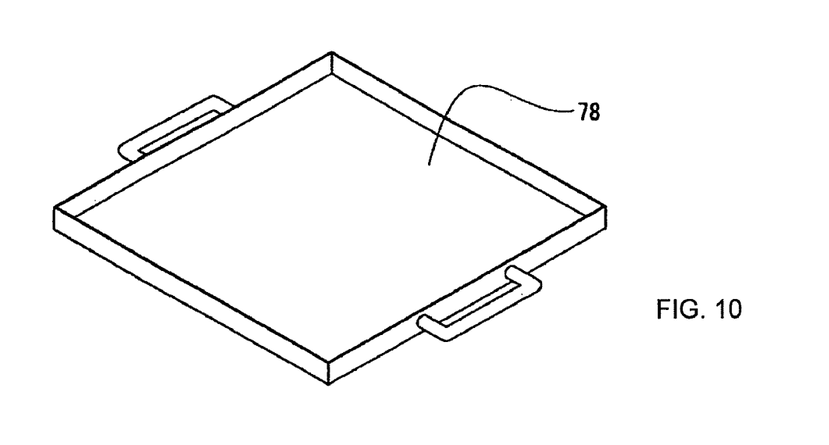
FIG. 10 is a perspective view of a constitutional example of a tray that is attached to the restraint device.

The restraint device 10 comprises a tray 78 that houses excretions and secessions at the bottom of the box-shaped body 12. A constitutional example of the tray 78 is shown in FIG. 10 in a perspective view. The tray 78 is constituted to enter and exit in a freely detachable manner via the lower opening in the first and second side walls 18 and 20 into and from the space below the foot stand 72. The tray is preferably formed by metal but is not limited thereto. The tray may be formed using a suitable preferable material in accordance with the design.

Figure 12:
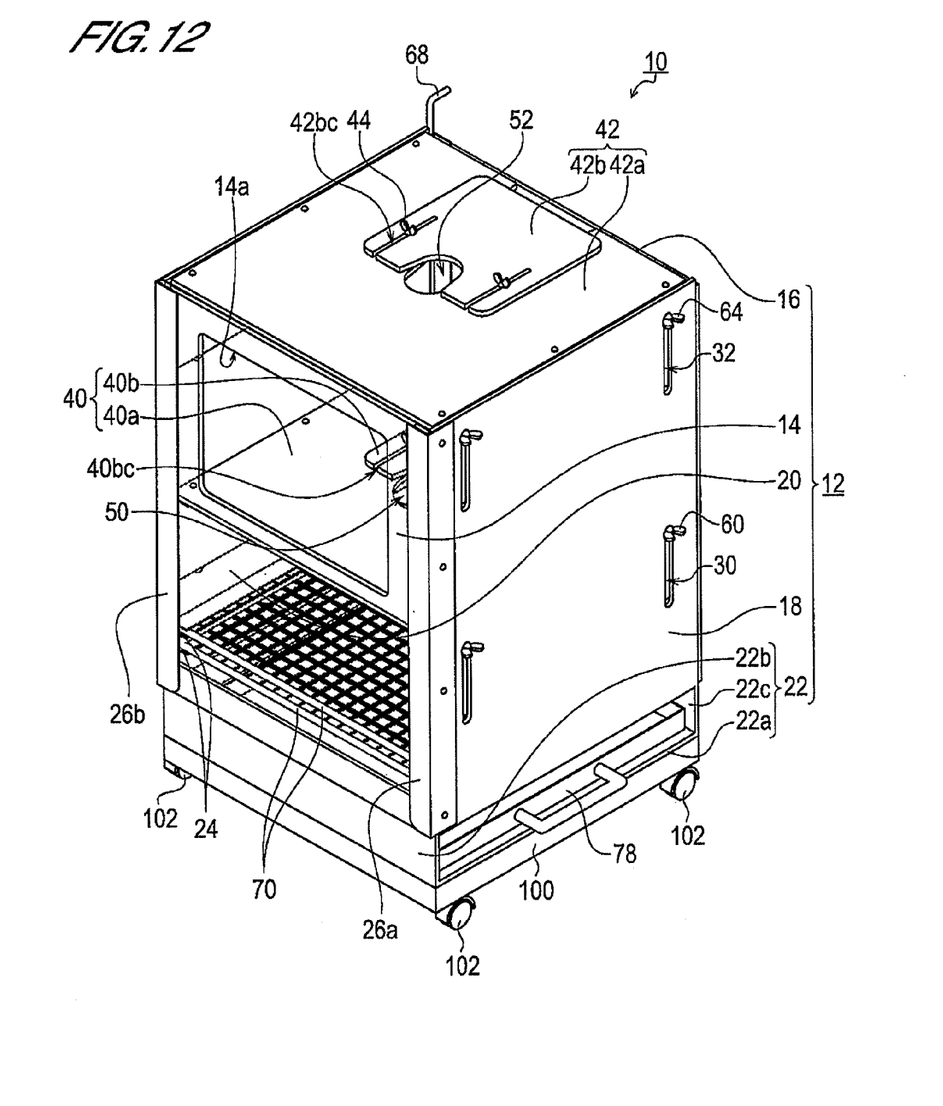
FIG. 12 is a schematic perspective view for explaining a constitution of a restraint device with a wheeled platform according to another embodiment of the present invention.

In addition, a wheeled platform 100 with four wheels 102 may also be provided, for example, on the underside of the bottom 22 of the restraint device 10. The provision of these wheeled platforms makes it possible to rapidly and easily move the restraint device 10.

FIG. 11 shows an aspect in which a squirrel monkey 80 which is a primate is housed in the restraint device 10 and is undergoing an experiment. FIG. 11 is provided with the front wall 14, first side wall 18 and rear wall 16 removed. The squirrel monkey 80 sits down with its feet placed on the foot stand 70, its waist on the waist stand 72, its body restrained by the first hole 50 which is formed by the first restraining means 40, and its neck restrained by the second hole 52 which is formed by the second restraining means 42. Thus, according to the restraint device 10, the squirrel monkey stretches out its hand to the touch panel 90 which is disposed opposite the front of the front wall of the front face of the restraint device 10 and is able to react and respond to various problems. Here, because the restraint of the body and neck is loose, the stress on the squirrel monkey can be kept to a minimum.

In addition, because adjustment of the height positions of the body and neck restraining means can be carried out in accordance with the size of the squirrel monkey, the restraint can be implemented at a height position which is optimal for the squirrel monkey and, therefore, the stress on the squirrel monkey can be further reduced for this reason.

In addition, because the positions of the body and neck are fixed, the squirrel monkey is able to always maintain the position of its eyes viewing the touch panel and the visual distance during the experiment and, therefore, more accurate experiment data can be obtained.

Moreover, because the front wall is constituted by a transparent material, the touch panel can be viewed in an unobstructed fashion by the squirrel monkey and, therefore, the squirrel monkey is able to react promptly to the problem provided.

In addition, depending on the case, the second restraining means can be tilted to more easily afford the squirrel monkey a direct look at the touch panel or, by forming the whole of the front wall from a transparent material to allow the squirrel monkey an extensive view of its surroundings, the squirrel monkey is able to relax still further.

For at least one of the above reasons, the restraint device according to the embodiment of the present invention is able to obtain more accurate visual psychological experiment data with the primate in a normal psychological state.

Although the box-shaped body is square according to the above embodiment, the box-shaped body can also be circular or another shape. In this case, the shape of the first and second plate-like bodies may be modified if necessary to allow the height and tilt of the first and second restraining means to be adjusted.

The invention claimed is:

1. A primate restraint device that is employed disposed opposite a touch panel in order to carry out visual psychological experiments on a primate, comprising:
    a box-shaped body which houses the primate, and which has first and second side walls provided opposite one another and a front wall and a rear wall which are provided opposite one another between the side walls, the side walls being provided with elongated upright holes along both sides of the side walls,
    wherein the box-shaped body comprises, therein, a foot stand, a waist stand, first restraining means capable of forming a first hole for restraining the body by adjusting the size of the first hole and second restraining means capable of forming a second hole for restraining the neck by adjusting the size of the second hole, which are provided in this order starting from the lower part of the box-shaped body;
    wherein the first hole and the second hole are formed in a positional relationship in which the body and the neck which are restrained by the respective holes are aligned on a vertical straight line;
    wherein the first restraining means and second restraining means are each provided between the opposing first and second side walls of the box-shaped body;
    wherein the first restraining means and second restraining means each comprise first and second plate-like bodies having a square planar shape, and first and second auxiliary plate bodies having a rectangular shape, the first and second auxiliary plate bodies being attached orthogonal to the first and second plate-like bodies on the two opposite sides of the first and second plate-like bodies;
    wherein the first restraining means and second restraining means each comprise first and second adjustment means for adjusting the height and tilt;
    wherein the first adjustment means is constituted by the elongated upright hole, the first auxiliary plate body and a fixing tool inserted into the elongated upright hole and fixed to the first auxiliary plate body;
    wherein the second adjustment means is constituted by another elongated upright hole, the second auxiliary plate body and another fixing tool inserted into another elongated upright hole and fixed to the second auxiliary plate body; and
    wherein the elongated upright holes each have a width in which both the first restraining means and second restraining means can be fixed in a tilted position by affording the two fixing tools which penetrate the two parallel elongated upright holes mutually displaced height levels.

2. The primate restraint device according to claim 1,
    wherein the first plate-like body is provided with a first cutout part which is U-shaped from one edge to an opposing edge;
    wherein the second plate-like body is provided with a second cutout part which is U-shaped from one edge to an opposing edge;
    wherein the first and second plate-like bodies of the first restraining means form the first hole by partially overlapping the first and second cutout parts in mutually opposite directions; and
    wherein the first and second plate-like bodies of the second restraining means form the second hole by partially overlapping the first and second cutout parts in mutually opposite directions.

3. The primate restraint device according to claim 2, wherein the first and second plate-like bodies are formed from a transparent material.

4. The primate restraint device according to claim 3, wherein the first side wall, second side wall, front wall and rear wall are constituted by a transparent material;
    wherein the front wall is provided in the box-shaped body above the first restraining means as a member which forms an opening that allows the primate to put a hand thereof outside the box-shaped body; and wherein the rear wall is provided in the box-shaped body as a door that opens and closes freely to allow the primate to enter and exit the box-shaped body.

5. The primate restraint device according to claim 3, wherein the foot stand is a drain board or wire mesh that is detachably provided in the box-shaped body; and
wherein the waist stand is retained by the foot stand.

6. The primate restraint device according to claim 3, wherein the box-shaped body comprises a tray for excretions or the like which is detachably provided below the foot stand.

7. The primate restraint device according to claim 3, wherein the lower end of the box-shaped body is provided with a wheeled platform.

8. The primate restraint device according to claim 2, wherein the first side wall, second side wall, front wall and rear wall are constituted by a transparent material;
wherein the front wall is provided in the box-shaped body above the first restraining means as a member which forms an opening that allows the primate to put a hand thereof outside the box-shaped body; and
wherein the rear wall is provided in the box-shaped body as a door that opens and closes freely to allow the primate to enter and exit the box-shaped body.

9. The primate restraint device according to claim 2, wherein the foot stand is a drain board or wire mesh that is detachably provided in the box-shaped body; and
wherein the waist stand is retained by the foot stand.

10. The primate restraint device according to claim 2, wherein the box-shaped body comprises a tray for excretions or the like which is detachably provided below the foot stand.

11. The primate restraint device according to claim 2, wherein the lower end of the box-shaped body is provided with a wheeled platform.

12. The primate restraint device according to claim 1, wherein the first side wall, second side wall, front wall and rear wall are constituted by a transparent material;
wherein the front wall is provided in the box-shaped body above the first restraining means as a member which forms an opening that allows the primate to put a hand thereof outside the box-shaped body; and
wherein the rear wall is provided in the box-shaped body as a door that opens and closes freely to allow the primate to enter and exit the box-shaped body.

13. The primate restraint device according to claim 12, wherein the foot stand is a drain board or wire mesh that is detachably provided in the box-shaped body; and
wherein the waist stand is retained by the foot stand.

14. The primate restraint device according to claim 12, wherein the box-shaped body comprises a tray for excretions or the like which is detachably provided below the foot stand.

15. The primate restraint device according to claim 12, wherein the lower end of the box-shaped body is provided with a wheeled platform.

16. The primate restraint device according to claim 1, wherein the foot stand is a drain board or wire mesh that is detachably provided in the box-shaped body; and
wherein the waist stand is retained by the foot stand.

17. The primate restraint device according to claim 1, wherein the box-shaped body comprises a tray for excretions or the like which is detachably provided below the foot stand.

18. The primate restraint device according to claim 1, wherein the lower end of the box-shaped body is provided with a wheeled platform.

19. A primate restraint device that is employed disposed opposite a touch panel in order to carry out visual psychological experiments on a primate, comprising:

a box-shaped body which houses the primate, and which has first and second side walls provided opposite one another and a front wall and a rear wall which are provided opposite one another between the side walls, the side walls being provided with elongated upright holes along both sides of the side walls,
wherein the box-shaped body comprises, therein, a foot stand, a waist stand, first restraining means capable of forming a first hole for restraining the body by adjusting the size of the first hole and second restraining means capable of forming a second hole for restraining the neck by adjusting the size of the second hole, which are provided in this order starting from the lower part of the box-shaped body;
wherein the first hole and the second hole are formed in a positional relationship in which the body and the neck which are restrained by the respective holes are aligned on a vertical straight line;
wherein the first restraining means and second restraining means are each provided between the opposing first and second side walls of the box-shaped body; and
wherein the first restraining means and second restraining means each comprise first and second plate-like bodies having a square planar shape, and first and second auxiliary plate bodies having a rectangular shape, the first and second auxiliary plate bodies being attached orthogonal to the first and second plate-like bodies on the two opposite sides of the first and second plate-like bodies, the first auxiliary plate body and second auxiliary plate body being each provided with elongated lateral holes that extend in a direction orthogonal to the elongated upright holes;
wherein the first restraining means and second restraining means each comprise first and second adjustment means for adjusting the height and tilt;
wherein the first adjustment means is constituted by one of the elongated upright holes, the first auxiliary plate body and a fixing tool inserted into the elongated upright hole and fixed to the first auxiliary plate body;
wherein the second adjustment means is constituted by another elongated upright hole, the second auxiliary plate body and another fixing tool inserted into another elongated upright hole and fixed to the second auxiliary plate body; and
wherein the elongated upright holes and the elongated lateral holes each have a width in which the first restraining means and second restraining means each can be fixed in a tilted position by affording the two fixing tools which penetrate the two parallel elongated upright holes and two elongated lateral holes opposite the elongated upright holes mutually displaced height levels.

20. The primate restraint device according to claim 19,
wherein the first plate-like body is provided with a first cutout part which is U-shaped from one edge to an opposing edge;
wherein the second plate-like body is provided with a second cutout part which is U-shaped from one edge to an opposing edge;
wherein the first and second plate-like bodies of the first restraining means form the first hole by partially overlapping the first and second cutout parts in mutually opposite directions; and
wherein the first and second plate-like bodies of the second restraining means form the second hole by partially overlapping the first and second cutout parts in mutually opposite directions.

* * * * *